United States Patent
Kodera et al.

(10) Patent No.: US 12,203,196 B2
(45) Date of Patent: Jan. 21, 2025

(54) NON-COATED AIR BAG FABRIC AND AIR BAG

(71) Applicant: SEIREN CO., LTD., Fukui (JP)

(72) Inventors: Shota Kodera, Fukui (JP); Tsuyoshi Houraiya, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 17/915,923

(22) PCT Filed: Mar. 30, 2021

(86) PCT No.: PCT/JP2021/013713
§ 371 (c)(1),
(2) Date: Sep. 29, 2022

(87) PCT Pub. No.: WO2021/201049
PCT Pub. Date: Oct. 7, 2021

(65) Prior Publication Data
US 2023/0144245 A1    May 11, 2023

(30) Foreign Application Priority Data
Mar. 31, 2020   (JP) ................... 2020-064928

(51) Int. Cl.
*B60R 21/235*   (2006.01)
*D03D 1/02*   (2006.01)
(Continued)

(52) U.S. Cl.
CPC ............. *D03D 1/02* (2013.01); *B60R 21/235* (2013.01); *D03D 13/008* (2013.01);
(Continued)

(58) Field of Classification Search
CPC ...... D03D 1/02; D03D 13/008; D03D 15/283; D03D 15/33; D03D 13/004; B60R 21/235;
(Continued)

(56) References Cited

U.S. PATENT DOCUMENTS 6,601,614 B1* 8/2003 Ishii ................... D03D 15/41
139/389
8,261,779 B2* 9/2012 Horiguchi ............ D02G 3/446
139/389
(Continued)

FOREIGN PATENT DOCUMENTS

JP   8-41751 A    2/1996
JP   8-269870 A   10/1996
(Continued)

OTHER PUBLICATIONS

International Search Report (PCT/ISA/210) issued in PCT/JP2021/013713, dated Jun. 8, 2021.
(Continued)

*Primary Examiner* — Robert H Muromoto, Jr.
(74) *Attorney, Agent, or Firm* — Birch, Stewart, Kolasch & Birch, LLP (57) ABSTRACT

A non-coated air bag fabric according to the present invention includes a plurality of weft yarns and a plurality of warp yarns, in which the weft yarns and the warp yarns are constituted by multifilament yarns in which polyethylene terephthalate fibers are used, the number of filaments in each of the multifilament yarns ranges from 122 to 242, and a coefficient of kinetic friction of a surface of the fabric ranges from 1.15 to 1.25 or less, the coefficient of kinetic friction being calculated when a friction block in which polyvinyl chloride is used is brought into contact with the fabric placed
(Continued)

on a stage that is rotating at a rotation speed of 663 rpm, at a load of 5 N, using a torque type friction and wear tester.

6 Claims, 9 Drawing Sheets

(51) Int. Cl.
    *D03D 13/00*     (2006.01)
    *D03D 15/283*     (2021.01)
    *D03D 15/33*     (2021.01)
    *D03D 1/00*     (2006.01)

(52) U.S. Cl.
    CPC .......... *D03D 15/283* (2021.01); *D03D 15/33* (2021.01); *B60R 2021/23509* (2013.01); *B60R 2021/23542* (2013.01); *D10B 2331/04* (2013.01); *D10B 2401/00* (2013.01); *D10B 2505/124* (2013.01)

(58) Field of Classification Search
    CPC .......... B60R 2021/23509; B60R 2021/23542; D10B 2331/04; D10B 2401/00; D10B 2505/124
    See application file for complete search history.

(56) References Cited

U.S. PATENT DOCUMENTS

| | | | | |
|---|---|---|---|---|
| 10,737,656 B2* | 8/2020 | Houraiya | ............ | B60R 21/235 |
| 10,760,188 B2* | 9/2020 | Kodera | ............ | D03D 15/283 |
| 11,390,241 B2* | 7/2022 | Houraiya | ............ | D03D 15/283 |
| 11,414,042 B2* | 8/2022 | Kodera | ............ | B60R 21/235 |
| 11,414,794 B2* | 8/2022 | Kodera | ............ | B60R 21/235 |
| 11,560,115 B2* | 1/2023 | Kodera | ............ | B60R 21/16 |
| 11,738,709 B2* | 8/2023 | Kodera | ............ | D03D 1/02 428/35.2 |
| 11,752,968 B2* | 9/2023 | Kodera | ............ | B60R 21/237 280/743.1 |
| 11,752,969 B2* | 9/2023 | Kodera | ............ | D03D 15/283 280/743.1 |
| 2005/0218640 A1* | 10/2005 | Kokeguchi | ............ | B60R 21/235 280/743.1 |
| 2011/0036447 A1* | 2/2011 | Horiguchi | ............ | D02G 3/446 57/200 |
| 2018/0281737 A1* | 10/2018 | Houraiya | ............ | D03D 1/02 |
| 2018/0327940 A1* | 11/2018 | Hunt | ............ | D03D 1/02 |
| 2019/0218692 A1* | 7/2019 | Kodera | ............ | D03D 13/008 |
| 2020/0047704 A1* | 2/2020 | Kodera | ............ | D03D 15/283 |
| 2020/0247348 A1* | 8/2020 | Kodera | ............ | D03D 15/283 |
| 2020/0254957 A1* | 8/2020 | Houraiya | ............ | D03D 15/283 |
| 2020/0307497 A1* | 10/2020 | Kodera | ............ | D03D 15/283 |
| 2021/0016739 A1* | 1/2021 | Kodera | ............ | D03D 1/02 |
| 2021/0140073 A1* | 5/2021 | Kodera | ............ | D03D 1/02 |
| 2021/0197751 A1* | 7/2021 | Kodera | ............ | D06N 3/128 |

FOREIGN PATENT DOCUMENTS

| | | |
|---|---|---|
| JP | 2005-289363 A | 10/2005 |
| JP | 2007-284826 A | 11/2007 |
| JP | 4566490 B2 | 10/2010 |
| JP | 2019-501310 A | 1/2019 |
| WO | WO 2018/062333 A1 | 4/2018 |
| WO | WO 2018/181695 A1 | 10/2018 |

OTHER PUBLICATIONS

Extended European Search Report for European Application No. 21779417.1, dated Mar. 13, 2024.

* cited by examiner

NON-COATED AIR BAG FABRIC AND AIR BAG

TECHNICAL FIELD

The present invention relates to a non-coated air bag fabric and an air bag formed using the same.

BACKGROUND ART

Air bag devices are commonly provided in a vehicle as a safety device for occupant protection that protects an occupant from impact when a vehicle is in a collision. Conventionally, in order to prevent gas released from an inflator from leaking from the bag, most often coated fabric is used, but fabric needs to be light in weight due to demands for improvements in fuel consumption and the like and needs to be compactly housed due to trends in steering wheel design and the like, and thus non-coated cloth is becoming widely adopted.

Heretofore, only air bags that can be housed in the steering wheel or an instrument panel and that are for forward collision were required to be provided under laws and regulations. However, the future trend is that, due to the revision of laws and regulations, air bags for side collision that are to be housed in seats and the upper portions of side windows will also be more commonly provided.

However, the position where an airbag for side collision is to be deployed is located near an occupant, and is to be deployed in a direction extending along a side portion of the occupant's body. Therefore, the occupant needs to be protected even if the occupant comes into contact with the air bag.

To address this issue, Patent Literature 1 discloses a technique relating to an air bag base cloth whose coefficient of friction is reduced by specifying the fineness and the density of filaments that constitute a fabric and applying a surface treatment agent.

Also, Patent Literature 2 discloses an airbag cloth that includes a fabric made of woven fibers and a coating that is provided on the fabric and forms a coated surface, and whose surface has a static friction coefficient of 0.4 or less.

Further, Patent Literature 3 discloses a technique relating to an air bag base cloth with a soft touch having a uniform low resistance when a folded fabric deploys, as a result of specifying the fineness of filaments that constitute the fabric, the single fiber fineness of filaments, surface roughness (SMD) measured using the KES, and the mean deviation of the friction coefficient (MMD) measured using the KES.

CITATION LIST

Patent Literature

Patent Literature 1: JP H8-41751A
Patent Literature 2: JP 2005-289363A
Patent Literature 3: Japanese Patent No. 4566490

SUMMARY OF INVENTION

Technical Problem

However, while the friction coefficient of the air bag base cloth disclosed in Patent Literature 1 is 0.25, measurement conditions and the like are not described in Patent Literature 1. Thus, assuming that an occupant and an air bag come into contact with each other when the air bag is deployed, the performance thereof is insufficient. Furthermore, resin that is used in softening treatment is applied, and flammability is a cause of concern.

Also, Patent Literature 2 discloses a cloth having a static friction coefficient of 0.4 or less. However, assuming that an occupant and an air bag come into contact with each other when the air bag is deployed, this contact will be dynamic and will occur at high speeds, and thus the performance thereof is insufficient. Also, the surface thereof is coated, and thus this air bag is inferior in terms of storability and the like. Further, it is difficult to read the peak of the coefficient of static friction of a fabric during measurement, and thus it is difficult to specify physical properties of the fabric based on the coefficient of static friction.

Although the smoothness of the surface of the air bag base cloth disclosed in Patent Literature 3 is specified according to the SMD and the MMD that are obtained through KES measurement, the texture of the air bag when deployed at high speeds is not envisioned, and thus the performance thereof is insufficient.

The present invention aims to provide a non-coated air bag fabric that has high storability and can solve problems relating to occupant protection when an air bag is deployed, and an air bag having the same.

Solution to Problem

That is, a non-coated air bag fabric according to the present invention includes:
a plurality of weft yarns; and
a plurality of warp yarns, in which the weft yarns and the warp yarns are constituted by multifilament yarns in which polyethylene terephthalate fibers are used, the number of filaments in each of the multifilament yarns ranges from 122 to 242, and a coefficient of kinetic friction of a surface of the fabric ranges from 1.15 to 1.25 or less, the coefficient of kinetic friction being calculated when a friction block in which polyvinyl chloride is used is brought into contact with the fabric placed on a stage that is rotating at a rotation speed of 663 rpm, at a load of 5 N, using a torque type friction and wear tester.

In the non-coated air bag fabric, the polyethylene terephthalate fibers may form a raw yarn.

The non-coated air bag fabric may have a weave density of 200/dm or more and 295/dm or less.

The non-coated air bag fabric may have a cover factor of 2300 to 2800.

In the non-coated air bag fabric, the multifilament yarns may have a single fiber fineness of 1.0 to 3.5 dtex.

In the non-coated air bag fabric, the diameter of a single fiber in the multifilament yarns may range from 0.0120 to 0.0190 mm.

An air bag according to the present invention is formed using any one of the above non-coated air bag fabrics.

Advantageous Effects of Invention

According to the present invention, it is possible to provide a non-coated air bag fabric and an air bag that have high storability and can protect an occupant when the air bag is deployed.

DESCRIPTION OF EMBODIMENTS

The following describes embodiments of a non-coated air bag fabric according to the present invention and an air bag using the same. A non-coated air bag fabric will be described first, and then an air bag formed using this fabric will be described.

1. Non-Coated Air Bag Fabric 1-1. Overview of Fabric

Weft and warp yarns of this fabric are formed using multifilament yarns in which polyethylene terephthalate fibers are used. The lower limit of the density of this fabric is preferably 205/dm or more, more preferably 210/dm or more, even more preferably 220/dm or more, and particularly preferably 250/dm or more. By setting the density to 205/dm or more, gaps between weaving yarns are small, and excellent low air permeability can be obtained. Also, the upper limit of the density is preferably 295/dm or less, and more preferably 280/dm or less. It is preferable that the density is 295/dm or less because the flexibility of the fabric is unlikely to be impaired and good storability can be obtained. Note that, in terms of the weave density, a range of 50.8 threads/cm or more and 75 threads/cm or less is preferable.

Also, a cover factor (CF) can be defined as follows. The cover factor (CF) can be obtained using the product of respective weave densities N and total finenesses D of the warp yarns and the weft yarns of a fabric, and is expressed using the following equation.

$$CF = Nw \times \sqrt{Dw} + Nf \times \sqrt{Df}$$

Here, Nw and Nf are weave densities (threads/2.54 cm) of the warp yarns and the weft yarns, and Dw and Df are total finenesses (dtex) of the warp yarns and the weft yarns.

Also, the cover factor preferably ranges from 2300 to 2800, more preferably ranges from 2400 to 2700, and particularly preferably ranges from 2500 to 2600. By setting the cover factor in this range, it is possible to obtain excellent low air permeability, good flexibility, productivity, and smoothness.

Yarns that constitute the fabric of the present invention preferably have a total fineness of 330 dtex or more, more preferably 380 dtex or more, and particularly preferably 450 dtex or more. If the total fineness of yarns is 330 dtex or more, the strength of the fabric is excellent for an air bag. Also, the total fineness is preferably 540 dtex or less, and more preferably 480 dtex or less because a lightweight fabric can be easily obtained.

With regard to the air permeability of the fabric of the present invention, air permeability that is measured using the Frazier method is preferably 0.5 ml/cm²·sec or less, and more preferably 0.3 ml/cm²·sec or less. If a base cloth for an air bag is formed using the fabric of the present invention, by setting the air permeability to the above-described value, gas leakage from the surface of this base cloth is reduced, the size of an inflator can be reduced, and quick deployment is made possible. Also, the air flow rate under a differential pressure of 20 kPa is preferably 0.9 L/cm²·min or less. By setting the air flow rate in such a range, it is possible to deploy the air bag without losing gas ejected from the inflator. Also, it is possible to obtain a deployment speed that is appropriate for quickly protecting an occupant.

The single fiber fineness of the yarns that constitute the fabric may have the same fineness or different finenesses, and preferably have a fineness of 1.0 to 3.5 dtex, more preferably have a fineness of 2.0 to 2.7 dtex, and particularly preferably 2.2 to 2.3 dtex. By setting the single fiber fineness to 3.5 dtex or less, it is possible to increase the flexibility of the fabric, improve the foldability of the air bag, and also reduce the air permeability. Also, the single fiber fineness is preferably 1.0 dtex or more because the single fibers are unlikely to break in a spinning process, a weaving process, or the like. In particular, if the single fiber fineness is small, smoothness is increased and a coefficient of kinetic friction at high speeds, which will be described later, is reduced.

Also, single fibers of the yarns that constitute the fabric preferably have a diameter of 0.0120 to 0.0190 mm, more preferably have a diameter of 0.0125 to 0.0185 mm, and particularly preferably have a diameter of 0.0130 to 0.0180 mm, and even more preferably have a diameter of 0.0135 to 0.0170 mm. In particular, if the single fibers have a small diameter, smoothness is increased, and thus a coefficient of friction at high speeds, which will be described later, is reduced.

Also, it is sufficient that the cross-sectional shape of a single fiber is selected from a circle, an ellipse, a flattened shape, a polygon, a hollow shape, other variants, and the like. It is sufficient to use mixed fibers, doubling yarns, combined use yarns, mixed use yarns thereof (the warp yarns and the weft yarns have different cross-sectional shapes), or the like as needed, and to appropriately select the cross-sectional shape to the extent that the spinning process, the fabric production process, the fabric physical properties, and the like are not hindered.

One or more of various additives that are usually used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The structure of the fabric may be any of a plain weave, a basket weave, a grid weave (ripstop weave), a twill weave, a cord weave, a leno weave, a mock leno weave, and a composite structure thereof. Beside a two-axis design with warp yarns and weft yarns, a multi-axis design including axes that are inclined at 60 degrees may be adopted as needed, and in this case, the arrangement of yarns need only be in conformity with the same arrangement of the warp yarns or the weft yarns. Among these, plain weave is preferable in terms of ensuring the tightness of the structure, the physical properties, and the evenness of the performance.

1-2. Multifilament Yarn

As described above, in the air bag fabric according to the present invention, weft yarns and warp yarns are formed using multifilament yarns in which polyethylene terephthalate fibers are used.

The number of filaments in a multifilament yarn is preferably in a range of 122 filaments or more and 242 filaments or less. The lower limit thereof is preferably 144 filaments or more, more preferably 160 filaments or more, and even more preferably 180 filaments or more. As a result of using such a multifilament yarn, the fabric has good flexibility, and thus the smoothness of surfaces of the fabric is also improved. As a result, it is possible to obtain an air bag having excellent low air permeability and good storability. On the other hand, the upper limit of the number of filaments is preferably 220 filaments or less, and more preferably 200 filaments or less, in order to maintain the strength of the air bag. This is because, if the number of filaments is high, the single fiber fineness (=total fineness/the number of filaments) is small, and the strength is reduced.

1-3. Coefficient of Kinetic Friction of Fabric Surface at High Speeds In the present invention, it is imperative that the coefficient of kinetic friction of the fabric surface at high speeds is 1.25 or less. The coefficient of kinetic friction at high speeds was measured using a torque type friction and wear tester (Tribogear TYPE:20 manufactured by Shinto Scientific Co., Ltd.). The coefficient of kinetic friction under high-speed conditions was measured by rotating the fabric at a speed of 663 rpm (10 km/H) in a state in which the fabric was fixed to a stage, and bringing a friction block into contact with the rotating fabric at a load of 5 N. Polyvinyl chloride, which is used for dummy dolls in automobile collision tests was used for the friction block. Measurement was performed at N=3, and the average thereof was recorded.

The upper limit of the coefficient of kinetic friction at high speeds is preferably 1.23 or less, more preferably 1.22 or less, and particularly preferably 1.20 or less. On the other hand, the lower limit of the coefficient of kinetic friction at high speeds is preferably 1.16 or more, and more preferably 1.17 or more. If the coefficient of kinetic friction at high speeds is 1.15 or more, the movement of the air bag at the time of deployment is stabilized, and if the coefficient of kinetic friction at high speeds is 1.25 or less, it is possible to protect an occupant when the airbag is deployed. There is no limitation on the method for making the coefficient of kinetic friction at high speeds 1.25 or less, and this can be realized by weaving multifilament yarns having a high number of filaments in the state of raw yarns, that is, in a non-twisted state, for example.

Using raw yarns reduces gaps between weaving yarns, increases the degree of filling of the fabric, and achieves excellent low air permeability. Also, it is preferable that the number of filaments is high because the smoothness of the surface is improved, the flexibility is unlikely to be impaired, and good storability can be obtained.

In the present invention, raw yarn refers to a non-twisted yarn, and a yarn not subjected to any particular twisting process as a process. As a method for producing a non-twisted yarn that can be used in the present invention, it is preferable to entangle yarns through an interlacing process, and the degree of entanglement at this time is more preferably 20 or less. Due to the degree of entanglement being 20 or less, pressure required to entangle yarn can be reduced, and even if the single fiber fineness is small, single fiber (a fiber) breakage can be reduced, and yarn fuzz and a decrease in the strength of the raw yarn are suppressed.

The degree of entanglement can be obtained as follows, for example. Water is introduced into a container, and an entangled yarn is floated on the water surface. Then, a reflecting rod emitting a color different from that of the entangled yarn is disposed below the entangled yarn in the container, and the distance between the entangled yarn and the reflecting rod is set to 1 to 5 mm. Subsequently, the reflecting rod is irradiated with light emitted from a light source located above the container so as to reflect the light, and the number of entangled portions of the entangled yarn is measured visually to obtain the degree of entanglement.

1-4. Characteristics

As described above, in the non-coated air bag fabric according to the present invention, the weft yarns and the warp yarns are formed using multifilament yarns in which polyethylene terephthalate fibers are used. Also, the number of filaments in this multifilament yarn ranges from 122 to 242 filaments. Also, the coefficient of kinetic friction of a surface of this fabric at high speeds is 1.25 or less.

In this manner, because the number of filaments is moderately high and the coefficient of kinetic friction at high speeds is lower than a predetermined value, yarns in the fabric have a high filling degree (the number of gaps is low), air permeability is low, and the surface of the base cloth has little unevenness. Also, because the number of filaments is moderately high and flexibility is increased, the base cloth can be easily folded. Thus, the influence on the flow of gas at the time of deployment of the air bag is reduced on the inner surface of the air bag due to good flexibility and storability being realized while air permeability is low, and the fabric surface is smooth. On the other hand, on the outer surface of the air bag, it is possible to prevent defects resulting from friction when the air bag is deployed.

Also, if the number of multifilaments is moderately increased and a fabric is woven at a moderate density, the fabric has high slip resistance and the number of openings of stitches in sewing portions of the air bag at the time of deployment is reduced. As a result, it is possible to reduce gas leakage from the sewing portions when the air bag is formed.

2. Air Bag

An air bag of the present invention can be obtained by joining at least one piece of main body base cloth obtained by cutting the above-described fabric of the present invention into a desired shape, to another piece of cloth. Although it is preferable that all pieces of main body base cloth that constitute the air bag are constituted by the fabric, there is no limitation to this, and a portion thereof may also be constituted by a base cloth constituted by another fabric. Also, it is sufficient to select the specifications, shape, and volume of the air bag in accordance with the site at which the air bag is to be disposed, the application, housing space, the occupant impact absorbing performance, the output of the inflator, and the like. Furthermore, a reinforcement cloth may be added according to required performance, and a non-coated fabric that is equivalent to the main body base cloth, a non-coated fabric that is different from the main body base cloth, or a coated fabric that is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly through sewing, it is possible to use partial adhesion, welding, or the like in combination, or use a joining method employing weaving or knitting, and there is no particular limitation on the joining method as long as the air bag has satisfactory durability, impact resistance at deployment, occupant impact absorbing performance, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewn portion is not long, sewing may be performed using a single-needle sewing machine a plurality of times. If a plurality of base cloths are used as an air bag main body, a plurality of base cloths may be sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel yarns, and any of a spun yarn, a filament twisted yarn, or a filament resin processed thread may be used.

Furthermore, in order to prevent gas leakage from stitches in outer circumferential sewn portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can be applied in multiple applications such as ships, railroad trains, electric railcars, aircraft, and amusement park equipment.

WORKING EXAMPLES

Hereinafter, the present invention will be described in more detail based on working examples, but the present invention is not limited to these working examples. Note that methods for evaluating working examples and comparative examples and a method for producing an air bag will be described, and then evaluations of working examples and comparative examples will be described.

Total Fineness of Yarns
Measurement was performed in conformity with method B in JIS L 1013 8.3.1.
Number of Yarn Filaments
Measurement was performed in conformity with JIS L 1013 8.4.
Single Fiber Fineness
The single fiber fineness was obtained by dividing the total fineness of yarns by the number of yarn filaments.

Figure 1:
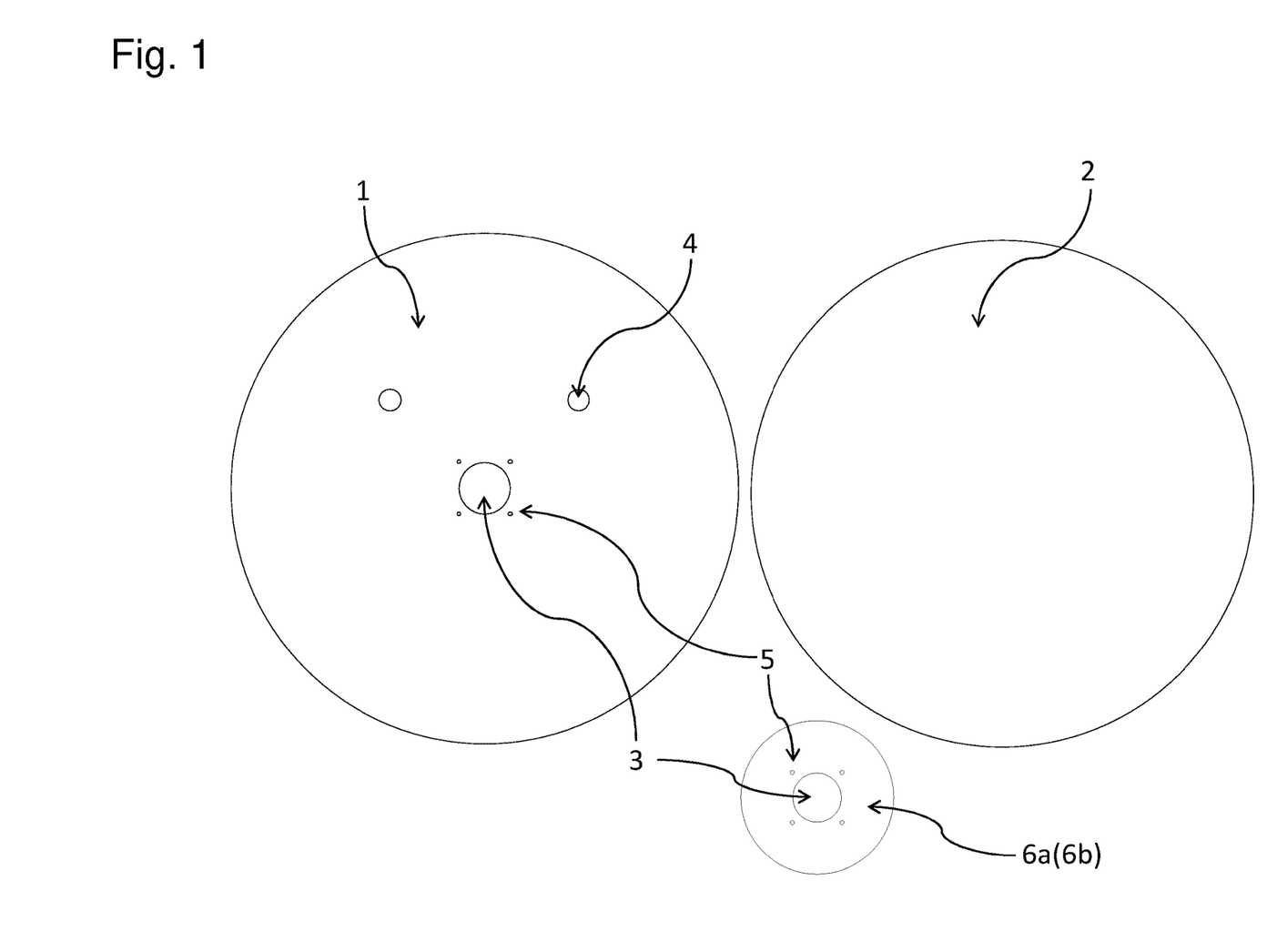
FIG. 1 is a diagram showing a state in which pieces of cloth have been cut for an air bag for evaluation.
Figure 2:
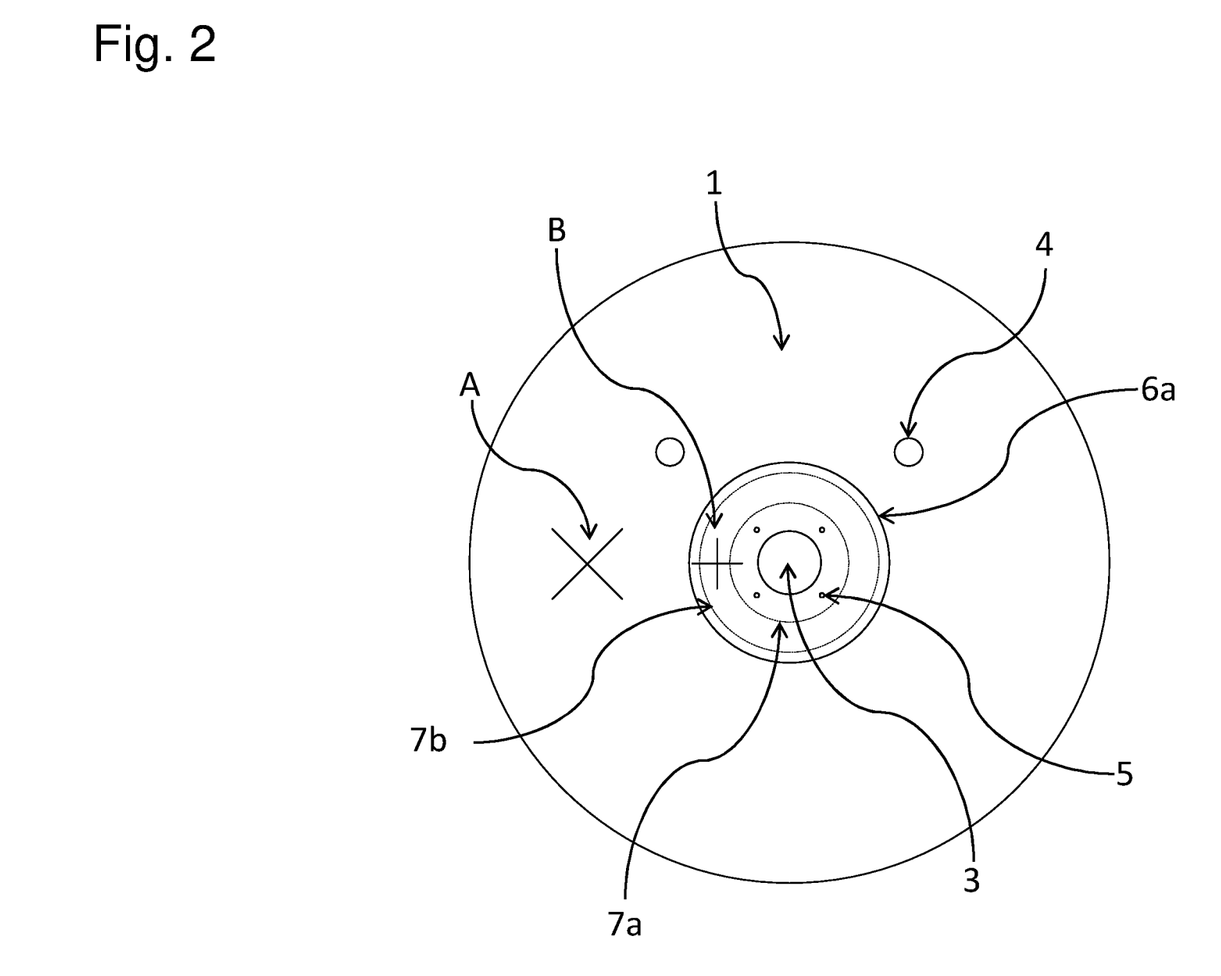
FIG. 2 is a diagram showing a state in which pieces of annular cloth 6a are sewn together.

Diameter of Single Fiber
The diameter of single fibers was obtained by taking images of a cross-section of a fabric using a scanning electron microscope, randomly selecting ten single fibers that are circular or elliptical in shape in a captured image, measuring the shortest diameter of the circular or the elliptical shape thereof, and calculating the average thereof.
Weave Density of Fabric
Measurement was performed in conformity with method A in JIS L 1096 8.6.1.
Cover Factor
Measurement was performed as described in the embodiment.
Thickness of Fabric
Measurement was performed in conformity with method A in JIS L 1096 8.4. The fabric preferably has a thickness of 0.30 mm or less.
Air Permeability of Fabric 1
Measurement was performed in conformity with method A (Frazier method) in JIS L 1096 8.26.1.
Coefficient of Kinetic Friction of Fabric at High Speeds
The coefficient of kinetic friction at high speeds was measured using a torque type friction and wear tester (Tribogear TYPE:20 manufactured by Shinto Scientific Co., Ltd.). The coefficient of kinetic friction under high-speed conditions was measured by rotating the fabric at a speed of 663 rpm (10 km/H) in a state in which the fabric was fixed to a stage, and bringing a friction block into contact with the rotating fabric at a load of 5 N. Polyvinyl chloride was used for the friction block. Measurement was performed at N=3, and the average thereof was recorded.
Openings of Stitches in Fabric
Two samples obtained by cutting the obtained fabric into 10 cm×10 cm pieces were stacked on each other. Then, a sample was prepared by lock stitching the two stacked samples with a stitch count of 35 stitches at a margin to the seam of 1.5 cm using a nylon sewing thread having a total fineness of 1440 dtex. The obtained sample was held by a chuck of a tensile testing machine (Instron), and openings in the stitches under a load of 50 kgf at 3 cm were evaluated using an electronic caliper. Due to gas from the inflator, a load acts on the sewing portions of an air bag and stitches thereof expand, and thus how far stitches expand is predicted through this test. An opening in a stitch is preferably 2.0 mm or less, and if the opening is larger than 2.0 mm, there is a risk that gas will leak.
Method for Producing Air Bag for Evaluation
A method for producing an air bag for evaluation will be described below with reference to FIGS. 1 to 4. A first circular main body base cloth 1 with a diameter of 702 mm and a second circular main body base cloth 2 with a diameter of 702 mm were cut from the prepared fabric. The main body base cloth 1 was provided, at its central portion, with an inflator mounting port 3 with a diameter of 67 mm and two air outlets 4 with a diameter of 30 mm at two positions (left and right pair) located 125 mm upward of and 115 mm respectively to the left and right from the center of the mounting port 3. Furthermore, the main body base cloth 1 was provided with bolt fixing holes 5 with a diameter of 5.5 mm at positions located 34 mm upward and downward of and 34 mm to the left and to the right from the center of the mounting port 3 (see FIG. 2).

Figure 3:
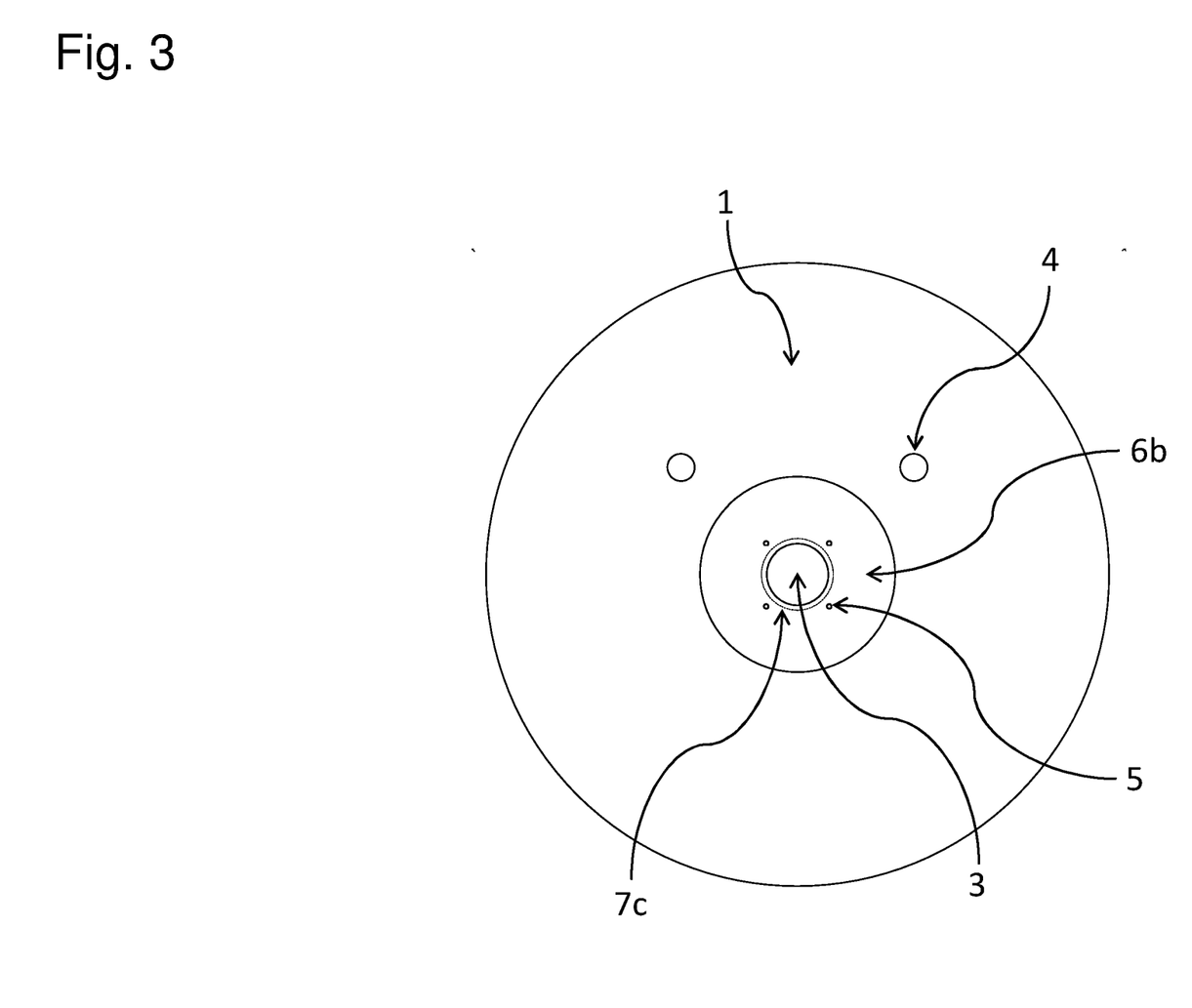
FIG. 3 is a diagram showing a state in which annular cloth 6b is sewn.

Also, a non-coated base cloth that was produced using 470 dtex, 72f nylon 66 fibers and had a weave density of 53/2.54 cm and a coated base cloth that was obtained by coating a base cloth, which was produced using 470 dtex, 72f nylon 66 fibers and had a weave density of 46/2.54 cm, with a silicone resin at 45 g/m² were prepared as the reinforcement cloths. As the reinforcement cloths for the inflator mounting port 3 in the first main body base cloth 1, three pieces of first annular cloth 6a with an outer diameter of 210 mm and an inner diameter of 67 mm were cut from the non-coated base cloth, and one piece of second annular cloth 6b having the same shape as the first annular cloth 6a was cut from the coated base cloth. All of the pieces of annular cloth 6a and 6b were provided with bolt fixing holes with a diameter of 5.5 mm. Then, the three pieces of first annular cloth 6a were overlaid on the first main body base cloth 1 such that the weaving direction of the reinforcement cloth was rotated by 45 degrees with respect to the weaving direction of the main body base cloth 1 (see weaving directions A and B in FIG. 2) and the positions of the bolt fixing holes coincided with each other. The pieces of first annular cloth 6a that were overlaid thereon were sewn in a circular shape at positions at a diameter of 126 mm (sewn portion 7a) and at a diameter of 188 mm (sewn portion 7b). Furthermore, similarly to the pieces of annular cloth 6a, the piece of second annular cloth 6b was overlaid thereon with the same weaving direction as the pieces of annular cloth 6a from the above, and the four pieces of annular cloth 6a and 6b were sewn to the first main body base cloth 1 in a circular shape at a position at a diameter of 75 mm (sewn portion 7c). The first main body base cloth 1 after sewing is shown in FIG. 3. Note that the pieces of annular cloth 6a and 6b were seamed with the main body base cloth 1 through lock stitching using a nylon 66 sewing thread with the needle thread being 1400 dtex and the bobbin thread being 940 dtex with a stitch count of 3.5 stitches/cm.

Figure 4:
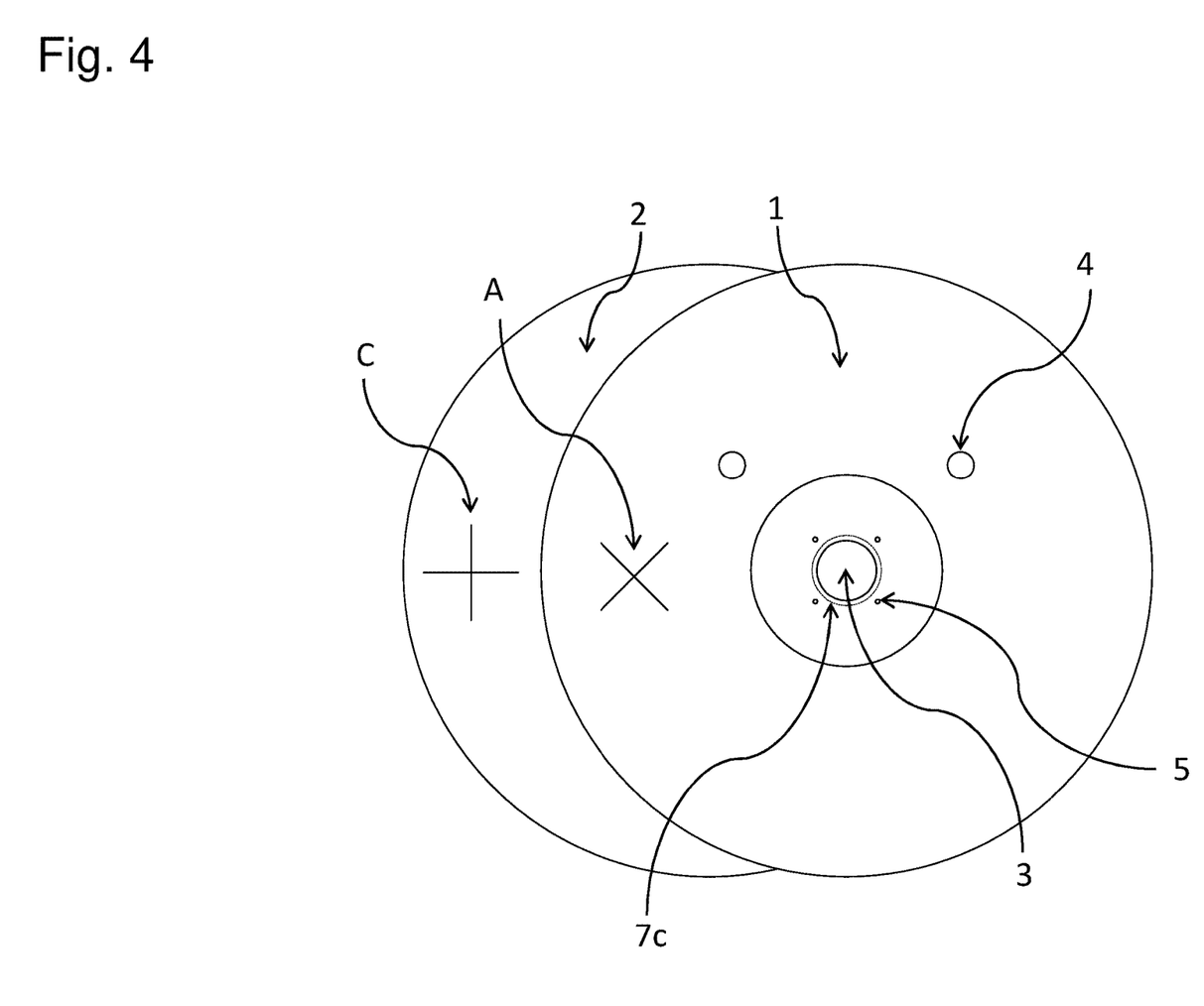
FIG. 4 is a diagram illustrating a weaving direction when sewing a main body base cloth 1 and a main body base cloth 2 together.
Figure 5:
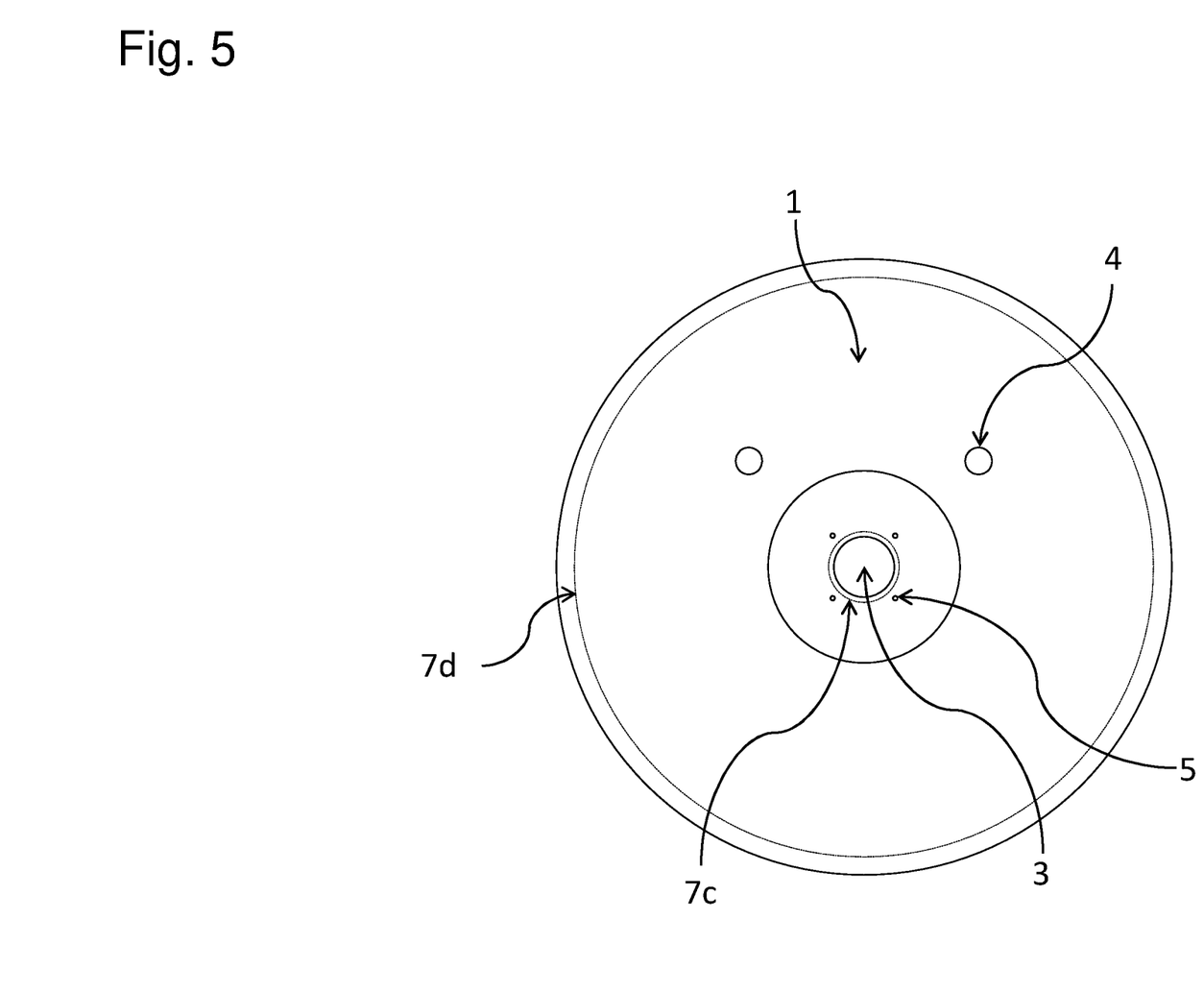
FIG. 5 is a diagram showing a state in which the main body base cloth 1 and the main body base cloth 2 are sewn together.

Then, the two main body base cloths 1 and 2 were stacked on one another. At this time, the surface of the first main body base cloth 1, with which the pieces of annular cloth 6a and 6b were seamed, was located on the outside and the weaving direction of the first main body base cloth 1 was rotated by 45 degrees with respect to the weaving direction of the second main body base cloth 2 (FIG. 4). Then, outer circumferential portions of the overlaid first and second main body base cloths were sewn together through double thread chain stitching with two rows (sewn portion 7d) with 2.4 mm between stitch lines and a margin to the seam of 13 mm. The sewn state is shown in FIG. 5. The bag was drawn out from the mounting port 11, and the inside and the outside were inverted after sewing so as to obtain a circular air bag with an inner diameter ø of 676 mm. A sewing thread that was the same as the above-described thread used in lock stitching was used as the sewing thread for sewing the outer circumferential portions.

Air Bag Storability (Foldability) Evaluation

Figure 6:
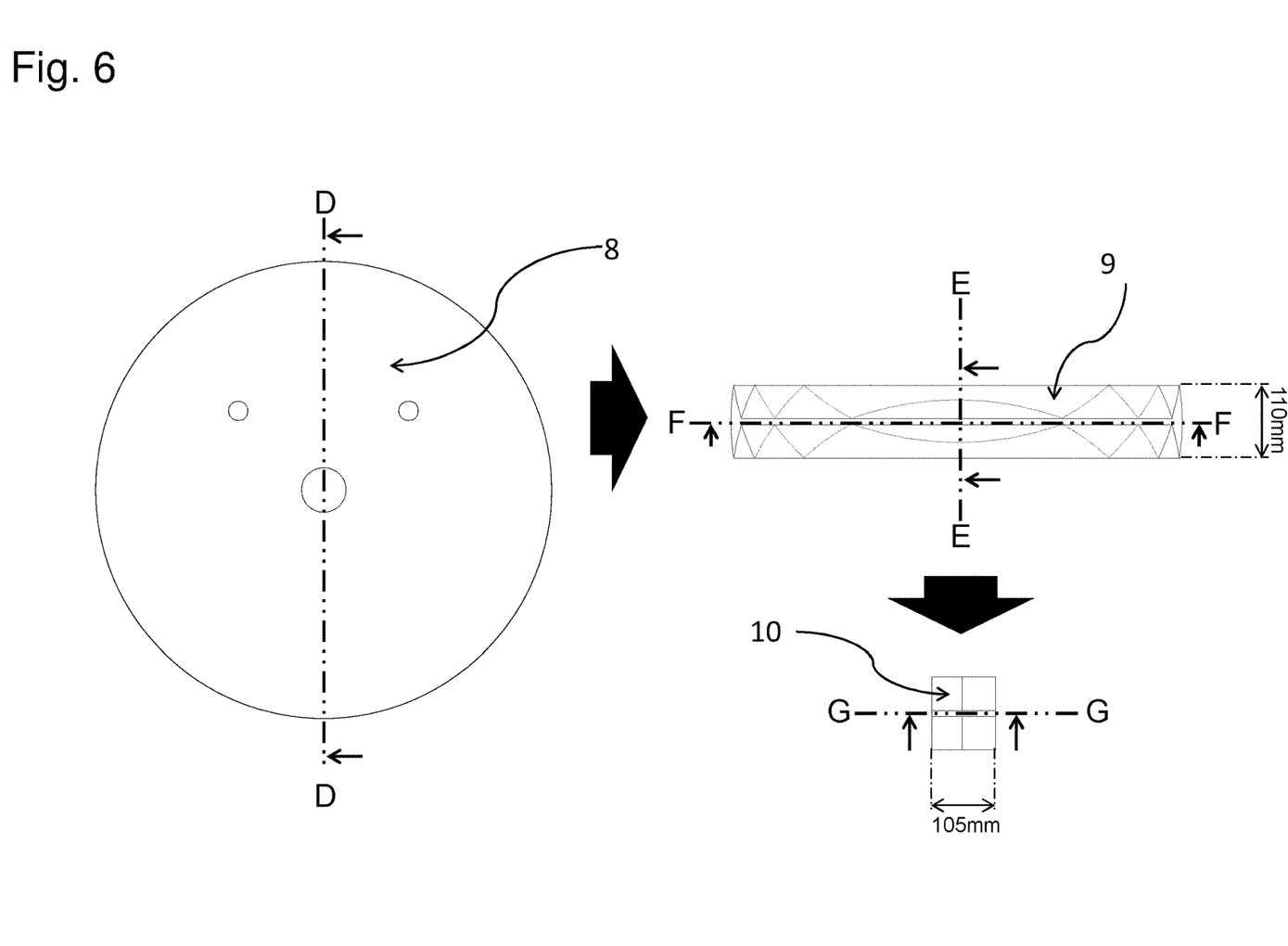
FIG. 6 is a diagram illustrating the manner in which an air bag for evaluation is folded.
Figure 7:
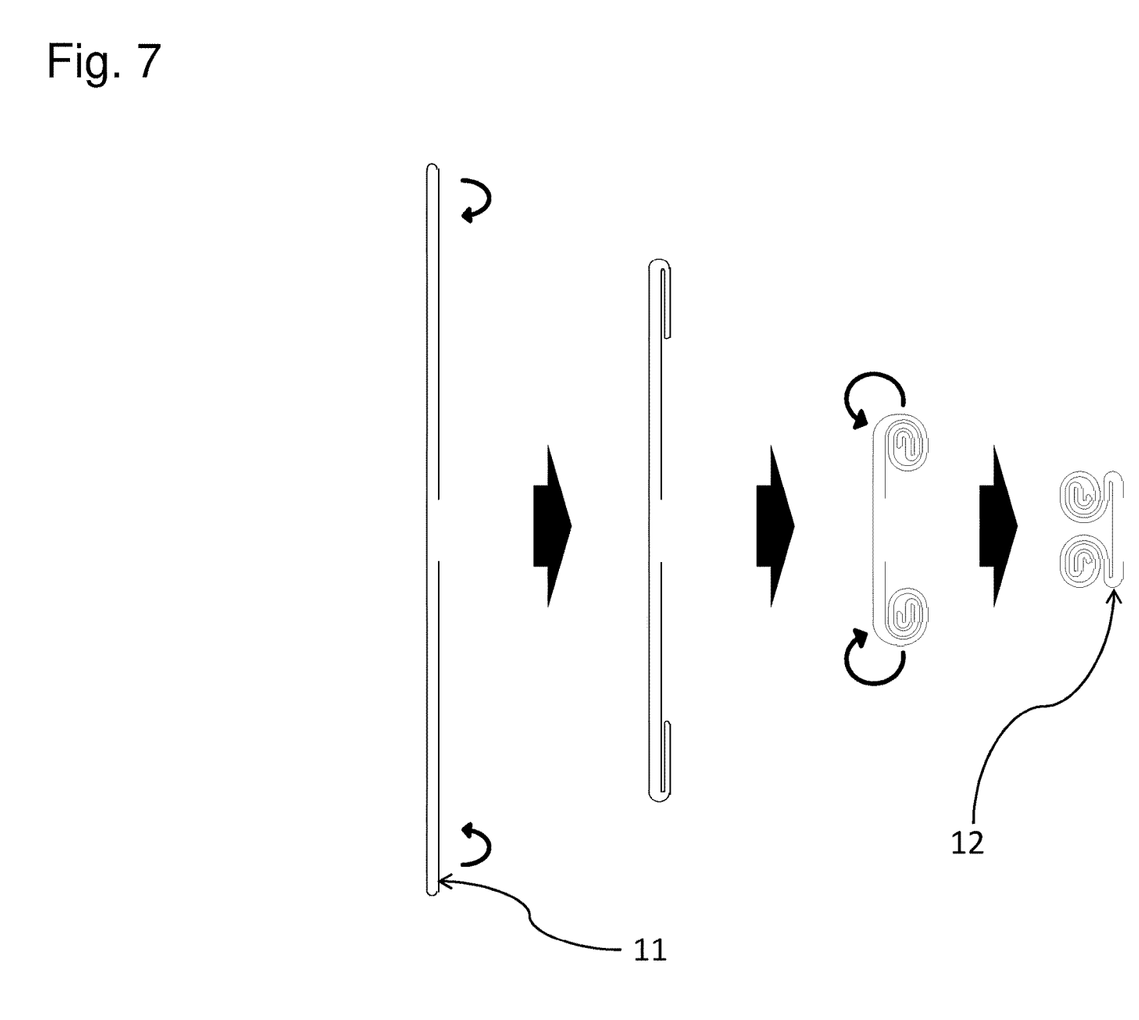
FIG. 7 is a cross-sectional view of the air bag for evaluation when folding the air bag for evaluation.
Figure 8:
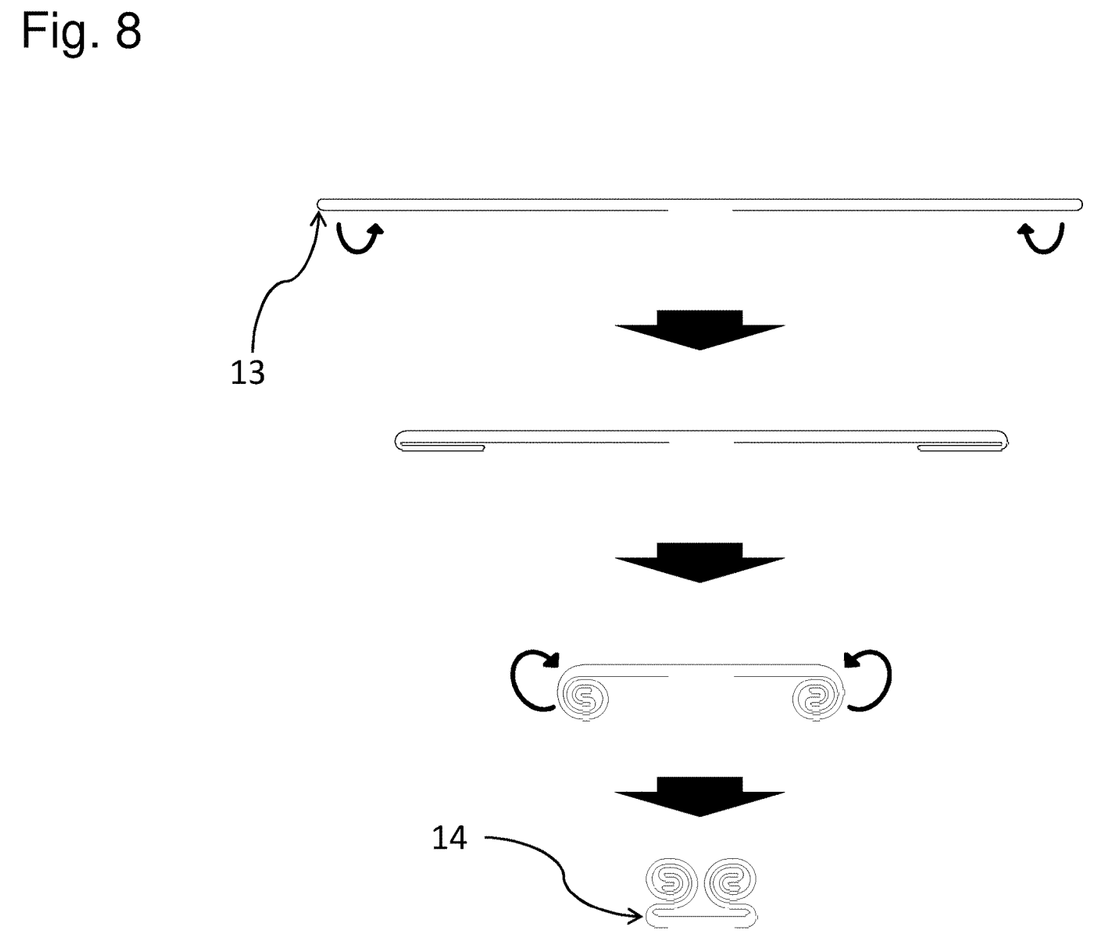
FIG. 8 is a cross-sectional view of the air bag for evaluation when folding the air bag for evaluation.

The air bag that was produced using the above-described method was folded following the procedures shown in FIGS. 6 to 8. FIG. 6 is a diagram showing a procedure used when an air bag for evaluation is folded with the occupant side being the front. FIG. 7 is a cross-sectional view of the air bag for evaluation taken along line D-D, showing a procedure used when a pre-folding initial form 8 is folded into an intermediate form 9. The cross-sectional view taken along line E-E of the intermediate form 9 shown in FIG. 6 is a state 12 shown in FIG. 7. FIG. 8 is a cross-sectional view of the air bag for evaluation taken along line F-F, showing a procedure used when the intermediate form 9 is folded into a completely folded form 10. The cross-sectional view of the completely folded form 10 taken along line G-G shown in FIG. 6 is a final form 14 shown in FIG. 8.

Figure 9:
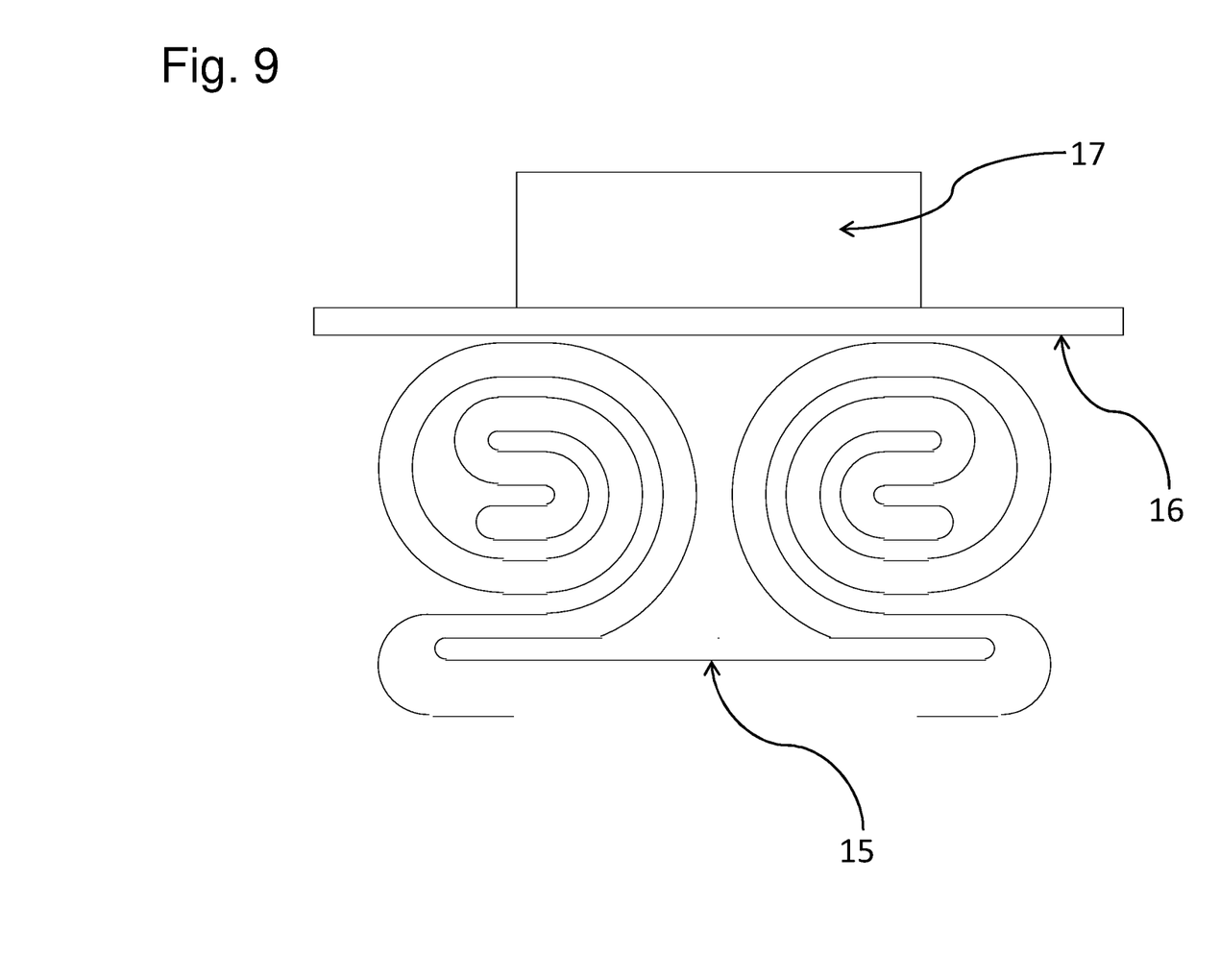
FIG. 9 is a diagram illustrating a method for evaluating storability.

While the air bag was being folded, adjustment was performed such that the width of the intermediate form 9 was 110 mm, and the width of the completely folded form 18 was 105 mm. Then, as shown in FIG. 9, a 130 mm×130 mm×2 mm aluminum plate 16 was placed on the folded air bag 15. The height of the folded air bag 15 was measured in a state in which a 1-kg weight 17 was placed thereon. Evaluation was made according to the height after folding, and a sample having a height of 45 mm or more after folding was evaluated as B, and a sample having a height of less than 45 mm was evaluated as A. Note that 45 mm is a value made in consideration of a space for housing a normal air bag.

Evaluation of impact from air bag on occupants

The air bag for evaluation was folded in the same manner as in the storability evaluation, and the airbag for evaluation was attached to equipment capable of performing an air bag deployment test in a state in which an inflator (EH5-200 manufactured by Daicel Corporation) was installed to the air bag for evaluation. An iron plate having a thickness of 10 mm and having a sufficient size was fixed at a position located 100 mm away from the attached air bag such that the air bag came into contact with the iron plate, and a piece of pressure-sensitive paper (FUJIFILM Corporation: Prescale Medium Pressure (MS)) was attached at the position where the air bag and the plate come into contact with one another. The air bag was brought into contact with the pressure-sensitive paper by deploying the air bag in this state. Because the discoloration range and the degree of discoloration (color depth) of the pressure-sensitive paper change depending on the strength of contact (pressure), evaluation was made by converting the discoloration into numerical values through image processing and calculating the sum of pressures.

The sum of pressures was calculated using the following procedure. First, the tested pressure-sensitive paper was scanned and the obtained image data was uploaded to a computer. The green component was extracted from the uploaded image data, and negative/positive conversion was performed to produce a second image. The second image was an 8-bit grayscale image, and the strength of pressure was expressed by 256 gradation values. Because the second image was subjected to negative/positive conversion, a portion to which high pressure was applied is expressed in white, and a portion to which low pressure was applied is expressed in black. Then, a histogram constituted by gradation values at each dot of the second image was created. In order to give a weight to each gradation value, the average gradation value was calculated by dividing the product of each gradation value and the number of dots for each gradation value by the total number of dots, the gradation value was divided by the average gradation value, and a weighting factor for each gradation value was calculated. Then, for gradation values that were above the average gradation value, the number of dots for each gradation value×weighting factor was calculated, and the sum of these values was calculated. The calculated sum was used as the sum of pressures. It can be said that, the larger the sum of pressures is, the stronger the contact pressure between the bag and a person is, and the smaller the sum of pressures is, the weaker the impact on the occupants is from the air bag. A sample having a sum of pressures of 90000 or less was evaluated as A (weak impact), and a sample having a sum of pressures of more than 90000 was evaluated as B (strong impact).

Next, working examples and comparative examples will be described. The following describes air bag fabrics according to Working Examples 1 to 3 and Comparative Examples 1 and 2, and the above-described evaluations made on air bags that were produced using these air bag fabrics. The results are shown in Table. 1. Note that multifilaments were formed using raw yarns (interlaced products) in working examples and comparative examples.

TABLE 1

|  |  | Ex. 1 | Ex. 2 | Ex. 3 | Comp. Ex. 1 | Comp. Ex. 2 |
|---|---|---|---|---|---|---|
| Fiber Type |  | PET | PET | PET | PA66 | PET |
| Total Fineness | dtex | 470 | 470 | 330 | 470 | 550 |
| No. of filaments | Filaments | 182 | 144 | 144 | 144 | 144 |
| Single Fiber Fineness | dtex | 2.58 | 3.26 | 2.29 | 3.26 | 3.82 |
| Diameter of Single Fiber | mm | 0.0151 | 0.0164 | 0.0142 | 0.0188 | 0.0182 |
| Density | /dm Warp | 224 | 224 | 275 | 208 | 204 |
|  | Weft | 224 | 224 | 275 | 208 | 204 |
| CF | — | 2467 | 2467 | 2538 | 2291 | 2430 |
| Air Flow Rate (128 Pa) | ml/cm² · sec | 0.19 | 0.29 | 0.09 | 0.07 | 0.29 |
| Air Flow Rate (20 kPa) | L/cm² · min | 0.68 | 0.79 | 0.42 | 0.27 | 1.05 |
| Number of Openings in Stitches | mm Warp | 1.11 | 0.93 | 0.82 | 1.10 | 1.03 |
|  | Weft | 1.17 | 0.96 | 0.93 | 1.27 | 1.05 |
|  | Avg. | 1.14 | 0.95 | 0.88 | 1.19 | 1.04 |
| Storability | mm | 40 | 44 | 39 | 48 | 52 |
|  | — | A | A | A | B | B |
| Coefficient of Kinetic Friction at High Speeds | — | 1.212 | 1.227 | 1.199 | 1.382 | 1.312 |
| Risk Assessment | Sum of Pressures | 89762 | 89935 | 87994 | 93151 | 91883 |
|  | — | A | A | A | B | B |

Working Example 1

A plain woven fabric was produced using polyethylene terephthalate yarns having a total fineness of 470 dtex, a filament number of 182, and a single fiber fineness of 2.58 dtex for the warp yarns and the weft yarns. Then, scouring and setting were performed so as to obtain a fabric in which the warp had a weave density of 224/dm and the weft had a weave density of 224/dm. The obtained fabric had a cover factor of 2467 and had a high-speed friction coefficient of 1.212. It is conceivable that, in particular, because the fabric had a low single fiber fineness, smoothness was increased and the coefficient of friction of the fabric at high speeds was reduced. An air bag for evaluation was produced using this fabric, and when storability evaluation was made, the height was 40 mm, and the airbag for evaluation was compactly folded. Further, when impact was evaluated, the sum of pressures was 89762, and thus it was confirmed that an air bag with weak impact was obtained.

Working Example 2

A plain woven fabric was produced using polyethylene terephthalate yarns having a total fineness of 470 dtex, a filament number of 144, and a single fiber fineness of 3.26 dtex for the warp yarns and the weft yarns. Then, scouring and setting were performed so as to obtain a fabric in which the warp had a weave density of 224/dm and the weft had a weave density of 224/dm. The obtained fabric had a cover factor of 2467 and a high-speed friction coefficient of 1.227. An air bag for evaluation was produced using this fabric, and when storability evaluation was made, the height was 44 mm, and the air bag for evaluation was compactly folded. Further, when impact was evaluated, the sum of pressures was 89935, and thus it was confirmed that an air bag with weak impact was obtained.

Working Example 3

A plain woven fabric was produced using polyethylene terephthalate yarns having a total fineness of 330 dtex, a filament number of 144, and a single fiber fineness of 2.29 dtex for the warp yarns and the weft yarns. Then, scouring and setting were performed so as to obtain a fabric in which the warp had a weave density of 275/dm and the weft had a weave density of 275/dm. The obtained fabric had a cover factor of 2538 and had a high-speed friction coefficient of 1.199. It is conceivable that, because the fabric had the lowest single fiber fineness, compared with those in Working Examples 1 and 2, smoothness was increased and the coefficient of friction of the fabric at high speeds was the lowest. An air bag for evaluation was produced using this fabric, and when foldability evaluation was made, the height was 39 mm, and the air bag for evaluation was compactly folded. Further, when impact was evaluated, the sum of pressures was 87994, and thus it was confirmed that an air bag with weak impact was obtained.

Comparative Example 1

A plain woven fabric was produced using polyamide 66 yarns having a total fineness of 470 dtex, a filament number of 144, and a single fiber fineness of 3.26 dtex for the warp yarns and the weft yarns. Then, scouring and setting were performed so as to obtain a fabric in which the warp had a weave density of 208/dm and the weft had a weave density of 208/dm. The obtained fabric had a cover factor of 2291 and had a high-speed friction coefficient of 1.382. An air bag for evaluation was produced using this fabric, and when foldability evaluation was made, the height was 48 mm, and the air bag for evaluation was bulky. Further, when impact was evaluated, the sum of pressures was 93151, and thus it was confirmed that an airbag that might have high impact was obtained. It is conceivable that the polyamide 66 yarn differs from the polyethylene terephthalate thread in specific gravity and the fibers of the polyamide 66 yarn have a larger diameter even though the polyamide 66 yarn has the same total fineness, and thus the storability and the coefficient of kinetic friction were inferior to those of the working examples. In contrast, it is conceivable that the diameter of the fibers in the polyethylene terephthalate thread is smaller than that of the fibers in the polyamide 66 yarn even though the polyethylene terephthalate thread has the same total fineness, and thus, as described above, smoothness was increased, and the coefficient of friction of the fabric at high speeds was low.

Comparative Example 2

A plain woven fabric was produced using polyethylene terephthalate yarns having a total fineness of 550 dtex, a filament number of 144, and a single fiber fineness of 3.82 dtex for the warp yarns and the weft yarns. Then, scouring and setting were performed so as to obtain a fabric in which the warp had a weave density of 204/dm and the weft had a weave density of 204/dm. The obtained fabric had a cover factor of 2430 and a high-speed friction coefficient of 1.312. An air bag for evaluation was produced using this fabric, and when foldability evaluation was made, the height was 52 mm, and the air bag for evaluation was bulky. Further, when impact was evaluated, the sum of pressures was 91883, and thus it was confirmed that an air bag that might have high impact was obtained. It is conceivable that, because Comparative Example 2 had a low weave density, high air permeability, and high single fiber fineness, storability and smoothness were poor, as a result of which, the coefficient of kinetic friction at high speeds was large.

LIST OF REFERENCE NUMERALS

1 Main body base cloth 1
2 Main body base cloth 2
3 Mounting port
4 Vent hole
5 Bolt fixing hole
6a, 6b Annular cloth for reinforcement
7a, 7b, 7c Sewn portion for fixing reinforcement cloth
15 Air bag
16 Aluminum plate
17 Weight
A Weaving direction of main body base cloth 1
B Weaving direction of annular cloth 6
C Weaving direction of main body base cloth 2

The invention claimed is:

1. A non-coated air bag fabric comprising:
a plurality of weft yarns; and
a plurality of warp yarns,
wherein the weft yarns and the warp yarns are constituted by multifilament yarns in which polyethylene terephthalate fibers are used,
the number of filaments in each of the multifilament yarns ranges from 122 to 242,
the diameter of a single fiber in the multifilament yarns ranges from 0.0130 to 0.0180 mm, and
a coefficient of kinetic friction of a surface of the fabric ranges from 1.15 to 1.25 or less, the coefficient of kinetic friction being calculated when a friction block in which polyvinyl chloride is used is brought into contact with the fabric placed on a stage that is rotating at a rotation speed of 663 rpm, at a load of 5 N, using a torque type friction and wear tester.

2. The non-coated air bag fabric according to claim 1, wherein the polyethylene terephthalate fibers form a raw yarn.

3. The non-coated air bag fabric according to claim 1, wherein the non-coated air bag fabric has a weave density of 200/dm or more and 295/dm or less.

4. The non-coated air bag fabric according to claim 1, wherein the non-coated air bag fabric has a cover factor of 2300 to 2800.

5. The non-coated air bag fabric according to claim 1, wherein the multifilament yarns have a single fiber fineness of 1.0 to 3.5 dtex.

6. An air bag formed using the non-coated air bag fabric according to claim 1.

* * * * *